US012695194B2

(12) United States Patent
Kim et al.

(10) Patent No.: US 12,695,194 B2
(45) Date of Patent: Jul. 28, 2026

(54) CAVITY FILTER ASSEMBLY

(71) Applicant: KMW INC., Hwaseong-si (KR)

(72) Inventors: Joung Hoe Kim, Hwaseong-si (KR); Kwang Nam Jeon, Seoul (KR); Jung Hee Won, Suwon-si (KR); Jong Min Park, Hwaseong-si (KR); Haeng Seok Choi, Hwaseong-si (KR); Seong Cheon Jo, Hwaseong-si (KR); Jong Youn Jung, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 384 days.

(21) Appl. No.: 18/134,011

(22) Filed: Apr. 12, 2023

(65) Prior Publication Data

US 2023/0246337 A1 Aug. 3, 2023

Related U.S. Application Data

(63) Continuation of application No. PCT/KR2021/014118, filed on Oct. 13, 2021.

(30) Foreign Application Priority Data

Oct. 14, 2020 (KR) ........................ 10-2020-0132382
Oct. 12, 2021 (KR) ........................ 10-2021-0135154

(51) Int. Cl.
*H01P 1/205* (2006.01)
*H01P 1/207* (2006.01)
*H01Q 9/04* (2006.01)

(52) U.S. Cl.
CPC ........... *H01Q 9/0407* (2013.01); *H01P 1/205* (2013.01); *H01P 1/2053* (2013.01); *H01P 1/207* (2013.01)

(58) Field of Classification Search
CPC ........ H01P 1/207; H01P 1/205; H01P 1/2053; H01P 1/208; H01P 1/20; H01P 1/201; H01P 1/202; H01P 7/04; H01P 7/06; H01P 7/00
(Continued)

(56) References Cited

U.S. PATENT DOCUMENTS 9,166,266 B1 * 10/2015 Liu ........................ H01P 1/202
2014/0327499 A1 * 11/2014 Park ........................ H01P 1/208
333/203
(Continued)

FOREIGN PATENT DOCUMENTS

CA 2263218 A1 8/1999
CN 104126247 A 10/2014
(Continued)

OTHER PUBLICATIONS

Extended European Search Report mailed Oct. 10, 2024 from the European Patent Office for European Application No. 21880505.9.
(Continued)

*Primary Examiner* — Stephen E. Jones

(57) ABSTRACT

The present disclosure relates to a cavity filter assembly and, particularly, comprises: a filter body having a cavity, which is a predetermined space therein; and at least one resonance bar having a front end surface that forms a stamped part, which is a protruding surface protruding from the bottom surface of the filter body toward the cavity so as to be parallel to the bottom surface of the filter body in the cavity, for frequency tuning in the cavity, and having a tuning correction hole that penetrates the stamped part, wherein the resonance bar allows frequency tuning to be performed in the cavity through stamping on the outer surface of the stamped part from the outside of the filter body, and the tuned frequency can be corrected through the tuning correction hole, and thus the advantages of reducing the total
(Continued)

weight and component costs of an antenna device and improving product productivity are provided.

13 Claims, 11 Drawing Sheets

(58) Field of Classification Search
USPC .......................................................... 333/206
See application file for complete search history.

(56) References Cited

U.S. PATENT DOCUMENTS

| | | | |
|---|---|---|---|
| 2016/0204493 | A1 | 7/2016 | Park et al. |
| 2018/0226707 | A1 | 8/2018 | Gao et al. |
| 2019/0334222 | A1 | 10/2019 | Wu et al. |

FOREIGN PATENT DOCUMENTS

| | | | |
|---|---|---|---|
| CN | 217009522 | U | 7/2022 |
| JP | 2005-341491 | A | 12/2005 |
| JP | 2015-510353 | A | 4/2015 |
| KR | 10-2010-0001571 | A | 1/2010 |
| KR | 10-2013-0098205 | A | 9/2013 |
| KR | 10-1380343 | B1 | 4/2014 |
| KR | 10-2017-0040642 | A | 4/2017 |
| WO | 2019/200604 | A1 | 10/2019 |
| WO | 2020/009312 | A1 | 1/2020 |

OTHER PUBLICATIONS

Non-final Office Action mailed Jun. 15, 2023 for Korean Application No. 10-2021-0135154.
Non-final Office Action mailed on Jun. 18, 2024 from the Japanese Patent Office for Japanese Application No. 2023-521703.
International Search Report mailed Jan. 17, 2022 for International Application No. PCT/KR2021/014118 and its English translation.
Chinese Office Action mailed on Mar. 28, 2026 from the State Intellectual Property Office for Chinese Application No. 202180070624.9 and its English translation.

* cited by examiner (a)

(b)

(a)

(b)

(a)

(b)

(a)

(b)

CAVITY FILTER ASSEMBLY

CROSS-REFERENCE TO RELATED APPLICATIONS

This application is a continuation application of International Application No. PCT/KR2021/014118, filed Oct. 13, 2021, which claims the benefit of Korean Patent Application Nos. 10-2020-0132382, filed Oct. 14, 2020; and 10-2021-0135154, filed Oct. 12, 2021, in the Korean Intellectual Property Office, the disclosures of which are incorporated herein in their entirety by reference.

TECHNICAL FIELD

The present disclosure relates to a cavity filter assembly, and more specifically, to a cavity filter assembly capable of reducing the entire weight of an antenna device and saving costs.

BACKGROUND ART

In general, an antenna device includes a main board on which feeding component elements and a plurality of RF filters are mounted and an antenna board disposed to be spaced apart from the main board and stacked, having a plurality of antenna elements serving as radiating elements mounted on a front surface thereof, and disposed to be stacked on front end portions of a plurality of RF filters.

FIG. 1 is an exploded perspective view showing a cavity filter assembly according to the related art and a cross-sectional view along line A-A in an assembled state.

There are various types of RF filters, but in particular, a cavity filter is the most frequently used type of RF filter because the assembly to the main board and frequency tuning are easy.

As shown in FIG. 1, a cavity filter 1 includes a filter body 10 formed to extend in a longitudinal direction and formed in a metallic enclosure shape having a predetermined space (hereinafter referred to as "cavity") therein, a plurality of resonator installation bosses 15 each provided to be spaced apart from each other on a bottom surface of a cavity C of the filter body 10, and a plurality of resonators 20 respectively installed on the resonator installation bosses 15.

In addition, as shown in FIG. 1, the cavity filter 1 further includes a filter cover 30 coupled in the form of covering an open one side of the cavity C formed in the filter body 10 and having tuning stamped parts 31 formed to facilitate frequency tuning inside the cavity C through an external stamping method of a frequency tuning designer. The tuning stamped part 31 formed in the filter cover 30 is processed and formed on an outer surface of the filter cover 30 and processed to be relatively smaller than a thickness of the filter cover 30, and a tuning correction hole 35 may be formed in a middle portion of the stamped part 31 so that the frequency tuning designer may easily correct an amount of stamping erroneously performed using a predetermined insertion tool (not shown).

Each of the plurality of resonators 20 includes a resonance bar 21 and a tuning screw 23 screw-fastening the resonance bar 21 to the resonator installation boss 15 through an inside of the resonance bar 21 and performing primary frequency tuning, as will be described below.

Here, the frequency tuning of the cavity filter 1 may be performed by primarily adjusting a height of the resonance bar 21 within the cavity C through the tuning screw 23 of the resonance bar 21 to adjust a distance from nearby components (e.g., the filter cover 30), and detailed adjustment of the frequency tuning may be secondarily performed according to an amount of stamping in which the stamped part 31 of the filter cover 30 correspondingly positioned above each resonator 20 is stamped inward from an outside using a predetermined stamping tool (not shown).

However, since in the cavity filter 1 according to the related art, the resonator installation boss 15 needs to be necessarily processed and formed inside the filter body 10 in order to install the resonance bar 21, there is a limit to a method of manufacturing the filter body 10, and there is a problem that the tuning screw 23 needs to be necessarily provided, resulting in an increase in the entire weight of the antenna device and an increase in component costs.

DISCLOSURE

Technical Problem

The present disclosure has been made in efforts to solve the problems and is directed to providing a cavity filter assembly capable of reducing the entire weight of an antenna device.

In addition, the present disclosure is directed to providing a cavity filter assembly capable of reducing costs by eliminating some components of a cavity filter assembly.

In addition, the present disclosure is directed to providing a cavity filter assembly capable of increasing productivity of a product by manufacturing each component using various manufacturing methods.

The objects of the present disclosure are not limited to the above-described objects, and other objects that are not mentioned will be able to be clearly understood by those skilled in the art from the following description.

Technical Solution

A cavity filter assembly according to one embodiment of the present disclosure includes a filter body having a cavity, which is a predetermined space, therein, and at least one resonance bar formed in a cylindrical shape having an open one side and installed on the filter body so that the closed other side is positioned to enter into the filter body by moving from an open one side to the other side of the filter body, wherein the resonance bar is formed with a stamped part, which is a protruding surface protruding toward the cavity, to be parallel to a bottom surface of the filter body for frequency tuning within the cavity, as a front end surface of the closed other side and formed with a tuning correction hole passing through the stamped part.

Here, the resonance bar may perform the frequency tuning within the cavity through the stamping of the stamped part outside the filter body and correct the tuned frequency through the tuning correction hole.

In addition, the frequency tuning within the cavity may be performed by an operation in which the stamped part of the resonance bar is stamped into the cavity by a stamping tool inserted into the resonance bar and a shape of the stamped part is deformed.

In addition, the correction of the frequency tuning within the cavity may be performed by an operation in which the stamped part of the resonance bar is pulled to an outside of the cavity by a pulling tool inserted into the resonance bar from an outside of the filter body and then inserted into the cavity through the tuning correction hole and a shape of the stamped part is deformed.

In addition, the cavity filter assembly may further include a filter cover coupled along an end of an edge portion of the filter body to form the cavity together with the filter body.

In addition, a resonance bar installation hole for installing the resonance bar may be formed in the filter body, and a coupling flange coupled in close contact with an outer surface of an edge of the resonance bar installation hole may be formed on the resonance bar.

In addition, the tuning correction hole may be formed in a hole shape having a predetermined diameter at the center of the stamped part.

In addition, a plurality of cavities may be provided by a partition wall for partitioning some of adjacent resonance bars among the at least one resonance bar and a window having a shape in which a part of the partition wall is cut.

In addition, the cavity may be defined by the filter body manufactured by a molding method to have an enclosure shape having an open one side and a filter cover manufactured by a press method to cover an open one side of the filter body.

In addition, the open one side of the filter body may be a portion opposite to the other side at which the at least one resonance bar is installed.

In addition, the cavity may be defined by the filter body manufactured by a molding method to have a flat shape and a filter cover coupled along an edge end portion of the filter body and manufactured by a deep-drawing press method so that a portion corresponding to the filter body side has an open enclosure shape.

In addition, the cavity may be defined by the filter body manufactured by an extrusion method so that one end portion and the other end portion are open in a longitudinal direction and an one side end cover and the other side end cover for covering the open one end portion and the other end portion of the filter body in the longitudinal direction.

In addition, the resonance bar may be manufactured by the deep-drawing press method.

A cavity filter assembly according to one embodiment of the present disclosure includes a filter body for defining a cavity in which resonance is generated, at least forming a bottom surface of the cavity, and formed with at least one resonance bar installation hole passing through an inside and an outside thereof, a filter cover for defining the cavity together with the filter body and shielding an open portion of the filter body, and at least one resonance bar installed to occupy a part of an internal space of the cavity defined by the filter body and the filter cover through a resonance bar installation hole of the filter body and performing frequency tuning through the deformation of a protruding surface of a front end inside the cavity.

Advantageous Effects

According to the cavity filter assembly according to one embodiment of the present disclosure, it is possible to achieve various effects as follows.

First, since the fixing screws and the resonator installation boss, which are main components of the conventional cavity filter, can be eliminated, it is possible to reduce the entire weight and component costs of the antenna device.

Second, since the shape of the filter body can be simplified, it is possible to pursue the diversification of the method of manufacturing the filter cover and the resonator, including the filter body, thereby increasing the productivity of the product.

DESCRIPTION OF REFERENCE NUMERALS

Figure 1:
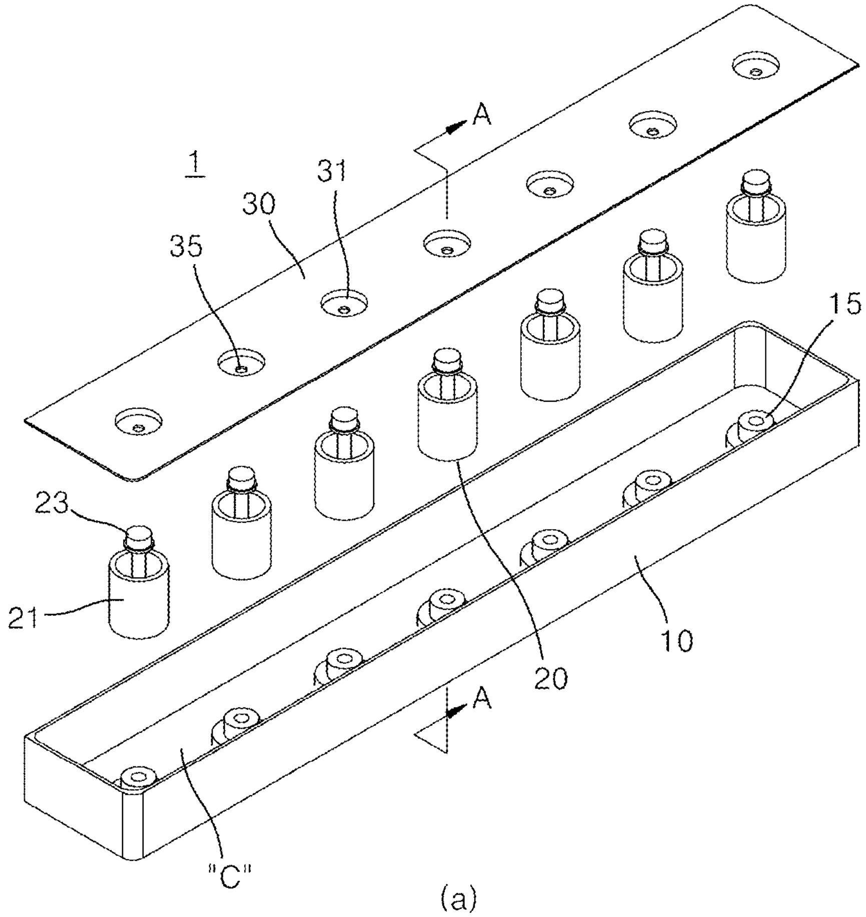
FIG. 1 (PRIOR ART)
FIG. 1 is an exploded perspective view showing a cavity filter assembly according to the related art and a cross-sectional view along line A-A in an assembled state.
Figure 1:
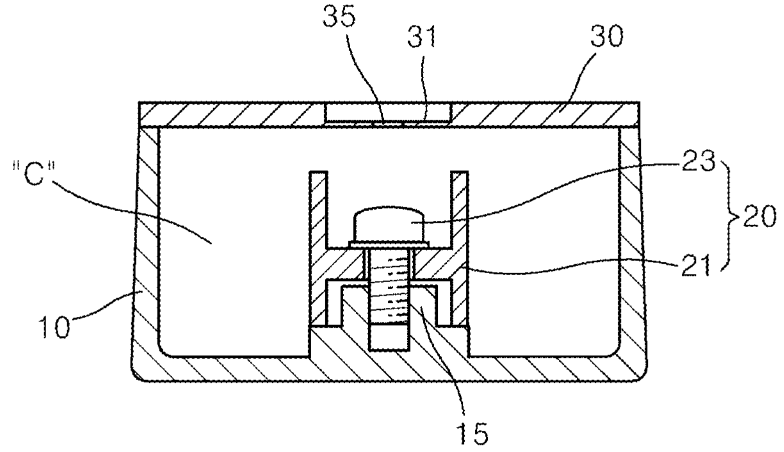
FIG. 1 (PRIOR ART)

100: Cavity filter assembly 110: Filter body
111*a*: Input connector 111*b*: Output connector
113: Partition wall 114: Window
115: Resonance bar installation hole 120: Resonance bar
124: Stamped part 125: Tuning correction hole
127: Coupling flange 130: Filter cover

MODE FOR INVENTION

Hereinafter, a cavity filter assembly according to embodiments of the present disclosure will be described in detail with reference to the accompanying drawings.

In adding reference numerals to components in each drawing, it should be noted that the same components have the same reference numerals as much as possible even when they are shown in different drawings. In addition, in describing embodiments of the present disclosure, the detailed description of related known configurations or functions will be omitted when it is determined that the detailed description obscures the understanding of the embodiments of the present disclosure.

The terms, such as first, second, A, B, (a), and (b) may be used to describe components of the embodiments of the present disclosure. The terms are only for the purpose of distinguishing one component from another, and the nature, sequence, order, or the like of the corresponding components is not limited by the terms. In addition, unless otherwise defined, all terms (including technical and scientific terms) used herein have the same meanings as those commonly understood by those skilled in the art to which the present disclosure pertains. The terms defined in a generally used dictionary should be construed as meanings that match with the meanings of the terms from the context of the related technology and are not construed as an ideal or excessively formal meaning unless clearly defined in this application.

Figure 2:
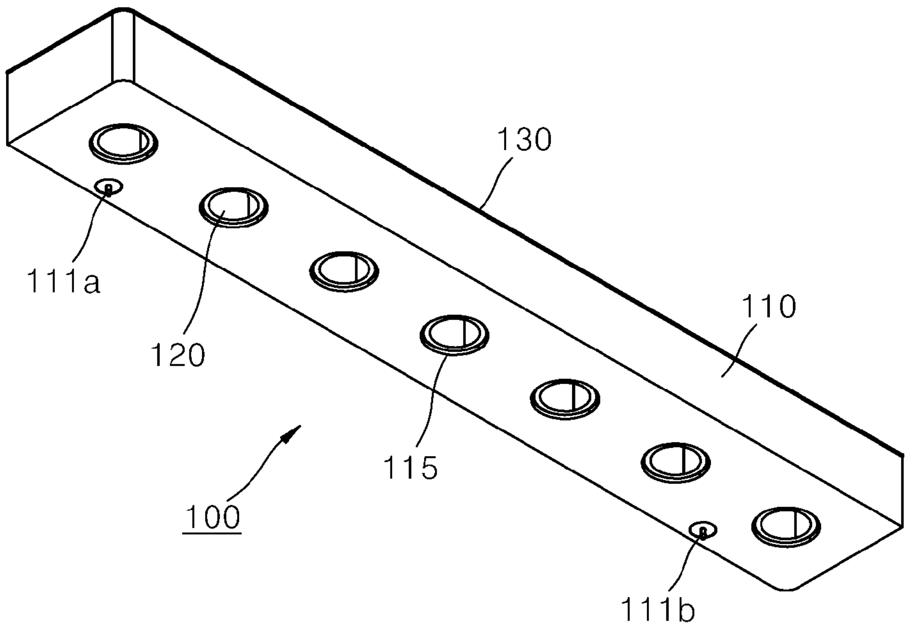
FIG. 2 is an upward perspective view and a downward perspective view showing a cavity filter assembly according to a first embodiment of the present disclosure.
Figure 2:
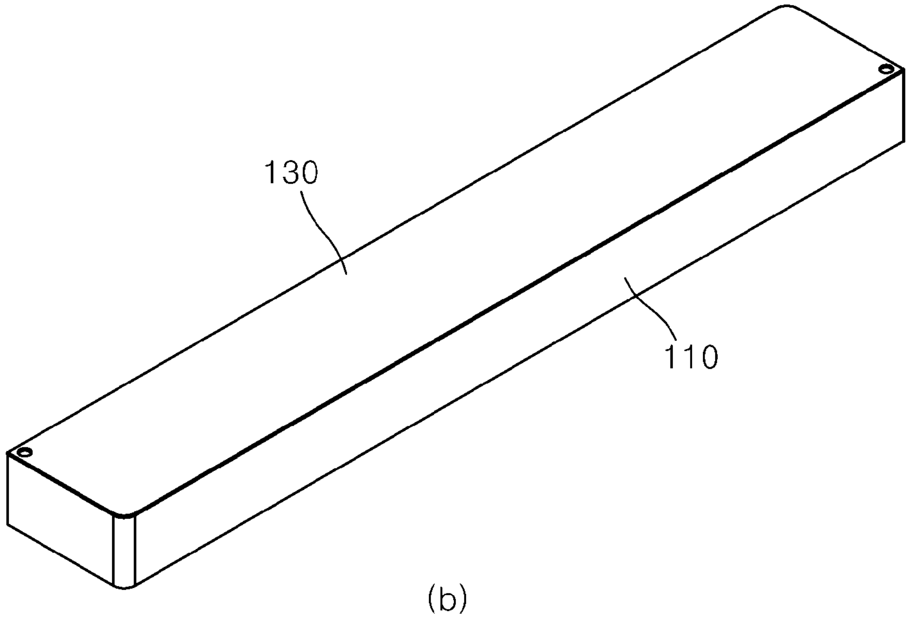
Figure 3:
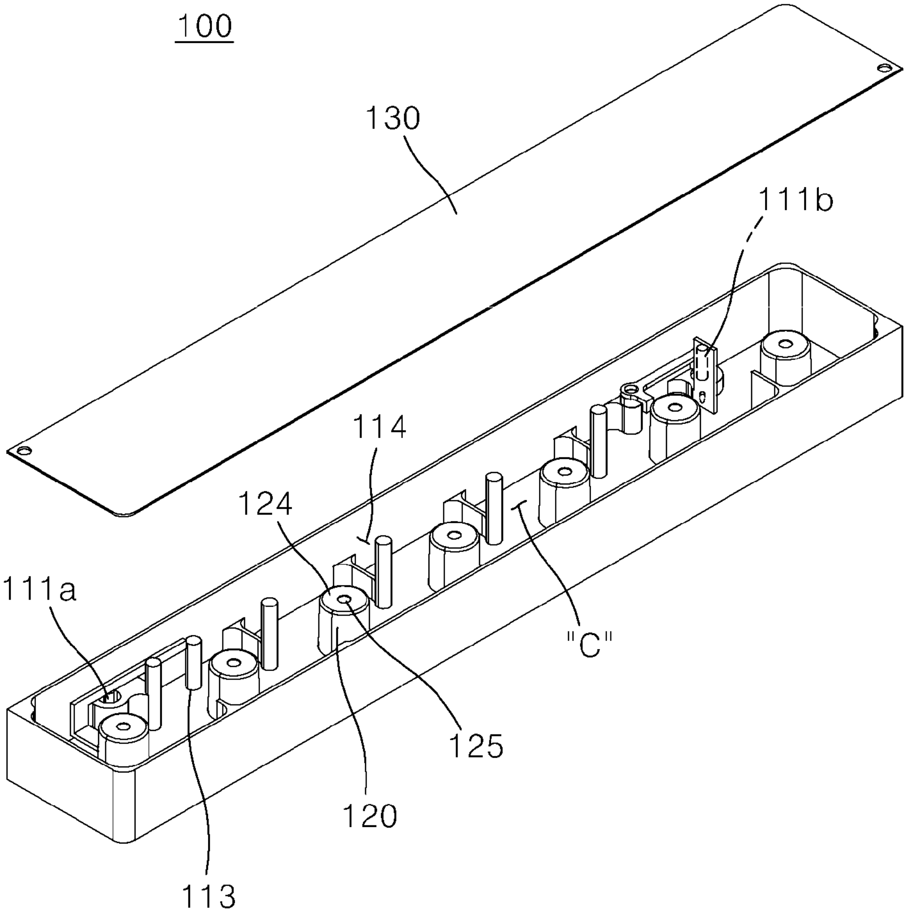
FIG. 3 is an exploded perspective view showing a state in which a filter cover is separated from the configuration of FIG. 2.
Figure 4:
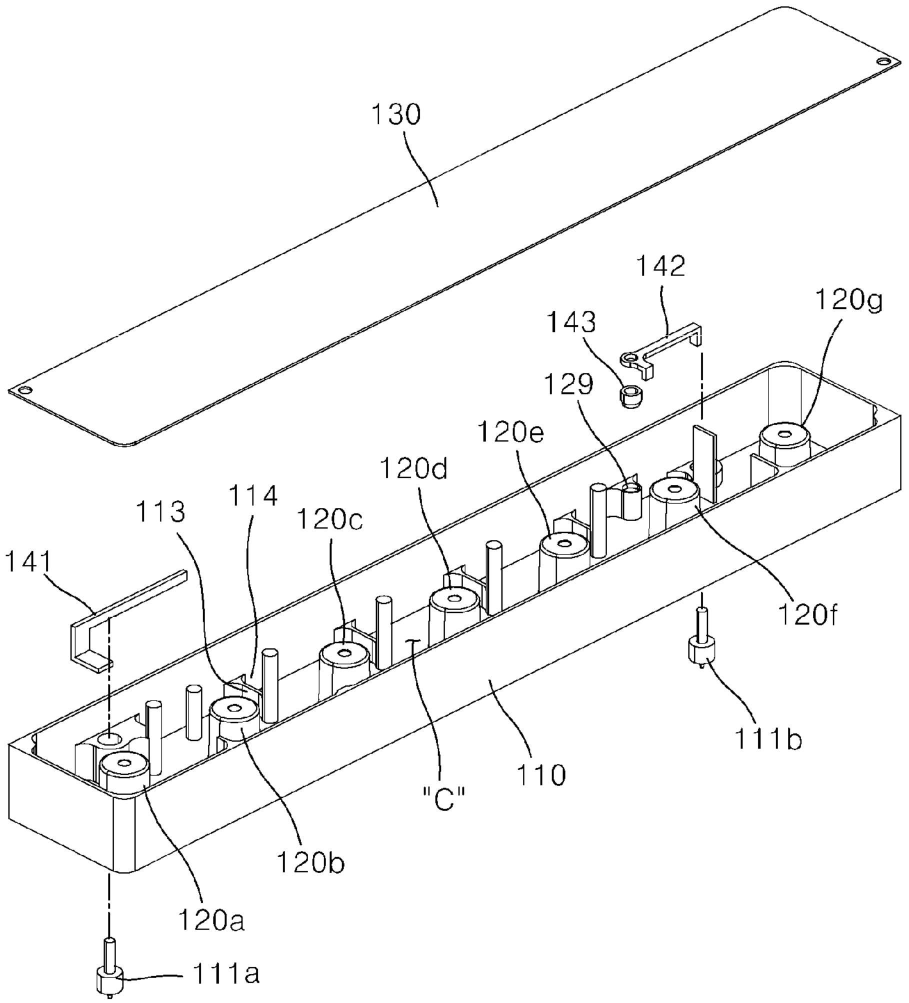
FIG. 4 is an exploded perspective view for describing coupling implementation by the cavity filter assembly according to the first embodiment of the present disclosure.
Figure 5:
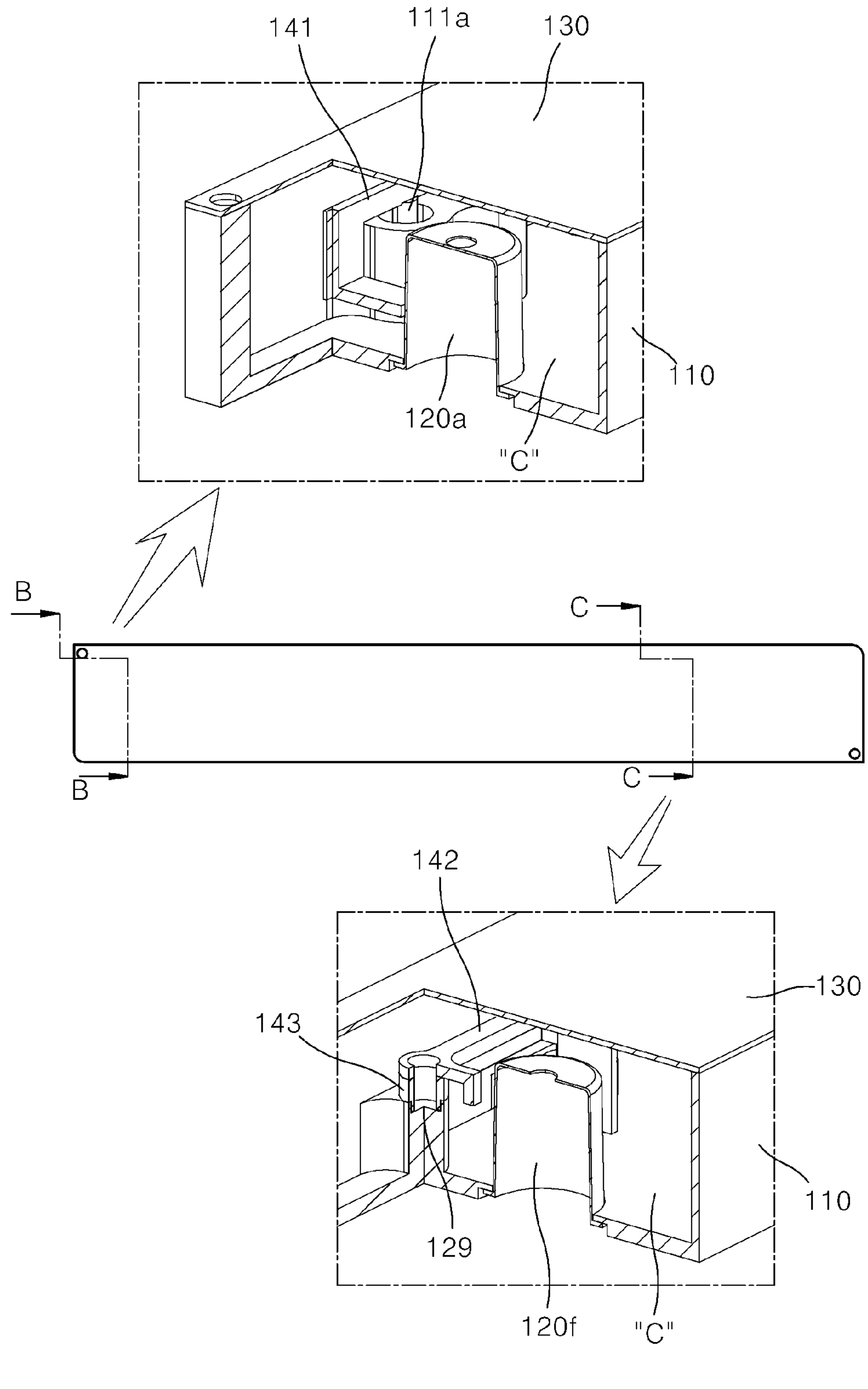
FIG. 5 is a cutout perspective view for describing an operation of an input-side notch bar and an output-side notch bar in the configuration of FIG. 4.
Figure 6A:
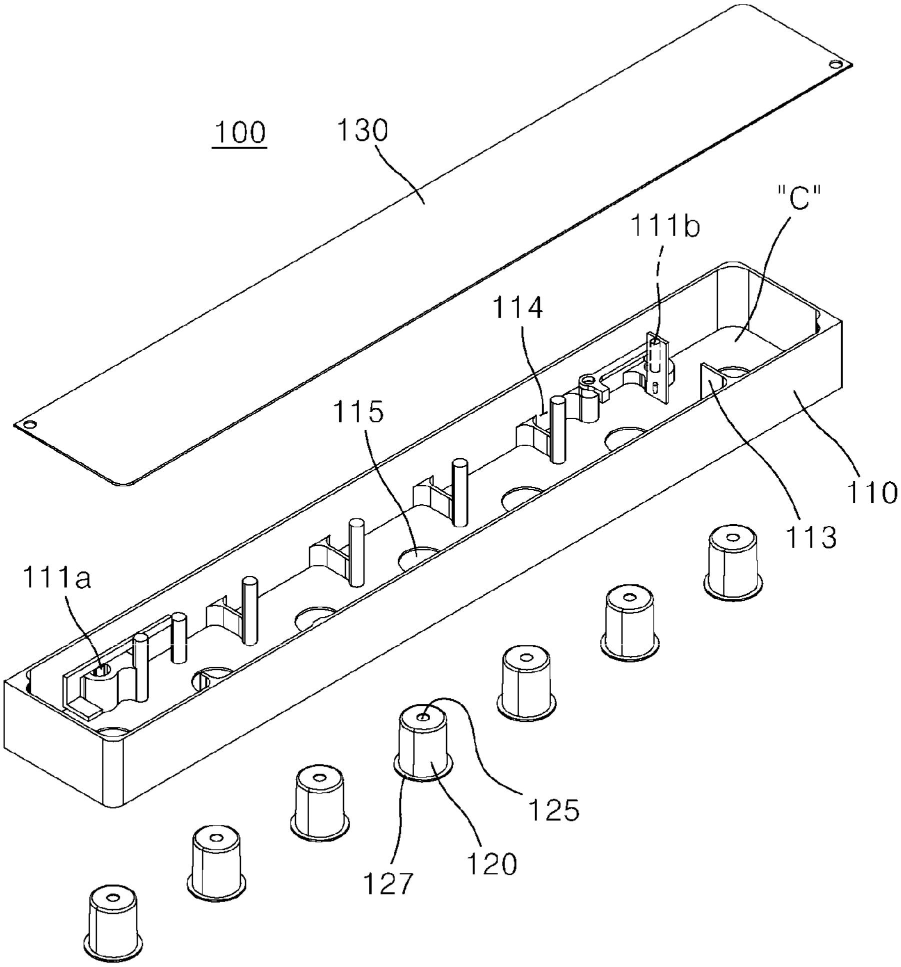
FIGS. 6A and 6B are a downward exploded perspective view and an upward exploded perspective view showing a state in which a filter cover and a resonance bar are separated from the configuration of FIG. 2.
Figure 6B:
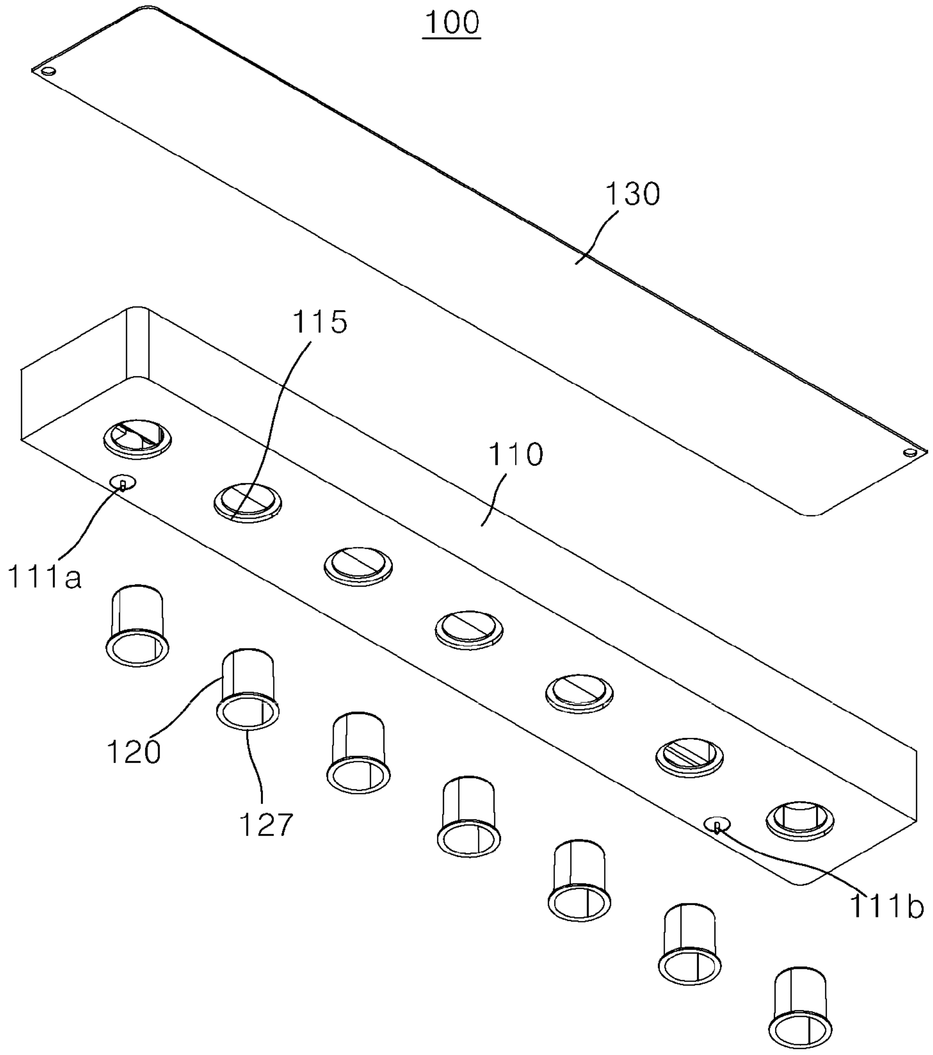

FIG. 2 is an upward perspective view and a downward perspective view showing a cavity filter assembly according to a first embodiment of the present disclosure, FIG. 3 is an exploded perspective view showing a state in which a filter cover is separated from the configuration of FIG. 2, FIG. 4 is an exploded perspective view for describing coupling implementation by the cavity filter assembly according to the first embodiment of the present disclosure, FIG. 5 is a cutout perspective view for describing an operation of an input-side notch bar and an output-side notch bar in the configuration of FIG. 4, and FIGS. 6A and 6B are a downward exploded perspective view and an upward exploded perspective view showing a state in which a filter cover and a resonance bar are separated from the configuration of FIG. 2.

As shown in FIGS. 2 to 6B, a cavity filter assembly 100 according to a first embodiment of the present disclosure may include a filter body 110 having a cavity C, which is a predetermined space, therein and at least one resonance bar 120 provided for frequency filtering within the cavity C of the filter body 110.

Here, the at least one resonance bar 120 may be formed in a cylindrical shape having an open one side and installed on the filter body 110 so that the closed other side is positioned to enter into the filter body 110. However, an exterior of the resonance bar 120 is not necessarily limited to a perfect cylindrical shape and includes a cylindrical shape whose diameter is gradually reduced toward the closed other side. In this case, a diameter of the open one side of the resonance bar 120 may be greater than a diameter of the closed other side (a stamped part 124 to be described below).

Meanwhile, it can be understood that in the cavity filter assembly 100 according to the first embodiment of the present disclosure, the cavity C is a space defined by the filter body 110 manufactured by a molding method to have an enclosure shape having the open one side and a filter cover 130 manufactured by a press method to cover the open one side of the filter body 110 as shown in FIGS. 2 to 6B. However, it should be noted that the cavity C may be defined differently from the cavity filter assembly 100 according to the first embodiment as in second and third embodiments to be described below.

A plurality of cavities C may be provided inside the filter body 110 to be partitioned into the number corresponding to the number of plurality of resonance bars 120.

More specifically, as shown in FIG. 3, in the cavity filter assembly 100 according to the first embodiment of the present disclosure, seven resonance bars 120 may be provided in the cavity C of the filter body 110. The seven resonance bars 120 are provided to implement coupling characteristics in a process of transmitting an electrical signal supplied from an input connector 111*a* at one side thereof to an adjacent resonance bar 120 and output the electrical signal through an output connector 111*b* at the other side thereof.

Here, by implementing the coupling characteristics between the resonance bars 120 within the cavity C, a frequency band to be filtered may be precisely adjusted by a partition wall 113 formed to partition the cavity C by the number of resonance bars 120 and a window 114 having a shape in which a part of the partition wall 113 is cut.

In the cavity filter assembly 100 according to the first embodiment of the present disclosure, as shown in FIGS. 3 and 4, the filter body 110 is provided to have a rectangular parallelepiped shape formed to extend in a longitudinal direction and has seven cavities C formed by the partition walls 113 and the windows 114 formed integrally therein (or separately manufactured and installed), and the seven resonance bars 120 (120*a* to 120*g*) are disposed within the partitioned cavities C to serve as seven resonators.

The filter body 110 may be manufactured by a molding method. A molding material of the filter body 110 may include a non-conductive resin material, such as plastic. However, the filter body 110 may be provided to have an inner surface formed with the cavity C and coated with a metal film in order to implement coupling characteristics according to the electrical signal within the cavity C or the like so that electromagnetic waves between the cavity C and the outside can be completely blocked.

Meanwhile, in the filter body 110, a plurality of resonance bar installation holes may be formed by being processed into a circular shape so that the plurality of resonance bars 120 are installed to be inserted into the cavity C from the outside of a bottom surface of the cavity C opposite to the open one side of the filter body 110. The plurality of resonance bar installation holes 115 may be formed stepwise so that edge portions of the resonance bars 120 are caught by and in close contact with the plurality of resonance bar installation holes 115.

Here, as shown in FIG. 3, a front end surface of the resonance bar 120 is formed with a stamped part 124, which is a protruding surface protruding from a bottom surface of the filter body 110 toward the cavity C (more preferably, the open one side of the filter body 110), to be parallel to the bottom surface of the filter body 110 in the cavity C for frequency tuning within the cavity C.

The resonance bar 120 may be formed in a substantially cylindrical shape that is open to the outside (one side) of the filter body 110, have an empty interior positioned inside the cavity C when inserted through the resonance bar installation hole 115 of the filter body 110, and be coupled in close contact with the resonance bar installation hole 115 in which the edge end of the open side of the resonance bar 120 is formed stepwise.

To this end, a coupling flange portion 127 may be formed on the resonance bar 120 to be coupled in close contact with an outer surface of the edge of the resonance bar installation bar 115 formed stepwise. The coupling flange 127 and the resonance bar installation hole 115 may be coupled in close contact with each other in various methods and it goes without saying that bonding coupling using a typical bonding material is also possible.

When inserted through the empty interior of the resonance bar 120 from the outside of the filter body 110 using a stamping tool (not shown) and then stamped by a predetermined external force, the stamped part 124 may be a component stamped into the cavity C to perform frequency tuning within the cavity C by a shape deformation operation. That is, secondary frequency tuning within the cavity C may be performed according to the amount of stamping of the stamped part 124.

Meanwhile, as shown in FIG. 3, a tuning correction hole 125 passing through the stamped part 124 may be further formed in the resonance bar 120.

When the stamped part 124 is stamped into the cavity C using the stamping tool to deform a shape thereof, the tuning correction hole 125 may be formed to re-correct a tuned frequency tuning state by adjusting the amount of stamping using a pulling tool (not shown) having a concept opposite to the stamping tool when the correction of the frequency tuning is required. The tuning correction hole 125 may be formed in the form of a hole having a predetermined diameter at the center of the stamped part 124. Here, since a horizontal area of the stamped part 124 requires a minimum area required for frequency tuning, it is preferable that a size of the tuning correction hole 125 is limited to ensure that the area of the stamped part 124 is greater than the minimum area.

More specifically, the pulling tool (not shown) may be formed in a structure that protrudes toward the cavity C through the tuning correction hole 125 and then caught by the edge portion of the cavity C side of the tuning correction hole 125, and as described above, when the pulling tool caught by the edge portion of the tuning correction hole 125 is pulled to the outside (i.e., toward the open one side of the resonance bar 120), the stamped part 124, which is stamped by the stamping tool and has the shape deformed into the cavity C, is pulled to an original position to correct the frequency tuning while correcting the frequency tuning in a direction in which the amount of stamping is reduced.

Meanwhile, the cavity filter assembly 100 according to the first embodiment of the present disclosure may further include the filter cover 130 provided to cover the open one side (the closed other side of the resonance bar 120 based on the resonance bar 120) of the filter body 110 as described above.

Unlike the filter body 110, the filter cover 130 may be manufactured by a press method. To this end, the filter cover 130 may be made of a metal material. However, a method of manufacturing the filter cover 130 is not limited to the press method. Like the filter body 110, the filter cover 130 may be manufactured by the molding method, and in this case, a plastic resin molding material may be included, and when the filter body 110 is made of the plastic resin molding material, it goes without saying that like the filter body 110, a metal film may be formed on the filter cover 130 in order to block electromagnetic waves inside and outside the cavity C.

That is, as shown in FIGS. 6A and 6B, the filter cover 130 is coupled to cover the open one side of the filter body 110 to serve to define an internal space, which is the cavity C for implementing frequency characteristics (i.e., coupling characteristics), and block the electromagnetic waves to minimize the influence of the external electromagnetic wave environment together with the filter body 110.

The electrical signal input through the input connector 111*a* performs frequency filtering while sequentially passing the plurality of resonance bars 120*a* to 120*g* provided to be spaced apart from each other in a straight direction inside the filter body 110 and then is output through the output connector 111*b*.

However, as in the cavity filter assembly 100 according to the first embodiment of the present disclosure, when the resonance bars 120*a* to 120*g* are straightly arranged in one direction, adjacent coupling between adjacent resonance bars may be smoothly implemented, while there is a problem that it is difficult to implement cross coupling for forming a specific notch at left and right sides of a path band. This is because the cross coupling is generally implemented by the input electrical signal transmitted to a resonance bar after skipping one or two or more adjacent resonance bars (or the cavities) and it is difficult to design such a structure when the resonance bars 120*a* to 120*g* (or the cavities) are disposed to extend in the straight line.

Accordingly, as shown in FIGS. 4 and 5, the cavity filter assembly 100 according to the first embodiment of the present disclosure is designed so that a formation position of the input connector 111*a* is located between the first resonance bar 120*a*, which is a first resonator, and the second resonance bar 120*b* adjacent thereto and designed so that a formation position of the output connector 111*b* is located between the seventh resonance bar 120*g*, which is an end resonator, and the sixth resonance bar 120*f* adjacent thereto. Front ends of the input connector 111*a* and the output connector 111*b* may be exposed to protrude toward the inside of the cavity through an input port hole (not shown) and an output port hole (not shown), respectively.

Furthermore, as shown in FIGS. 4 and 5, the cavity filter assembly 100 according to the first embodiment of the present disclosure may include an input-side metal notch bar 141 electrically connected to the input connector 111*a* and having one end positioned in the cavity corresponding to the first resonance bar 120*a* and the other end positioned in the cavity corresponding to the second resonance bar 120*b* and an output-side metal notch bar 142 having one end positioned in the cavity corresponding to the seventh resonance bar 120*g* and the other end positioned in the cavity corresponding to the sixth resonance bar 120*f*.

The input-side metal notch bar 141 may form a specific notch (more specifically, an L-notch) at a right end of the path band by implementing the cross coupling by the electrical signal input through the input connector 111*a* and transmitted to the second resonance bar 120*b* after skipping the first resonance bar 120*a*, and the output-side metal notch bar 142 may form a specific notch (more specifically, a C-notch) at a left end of the path band by implementing the cross coupling by the electrical signal passing the sixth resonance bar 120*f* and output to the output connector 111*b* after skipping the seventh resonance bar 120*g*.

In this case, the input-side metal notch bar 141 is short-circuited to be in direct contact with the structure within the cavity C and thus forms the L-notch at the right end of the path band as described above, while as shown in FIGS. 4 and 5, the output-side metal notch bar 142 is provided to be opened via a Teflon block 143 made of a dielectric material in order to prevent the direct contact with the structure of the cavity C and thus forms the C-notch at the left end of the path band.

Figure 7:
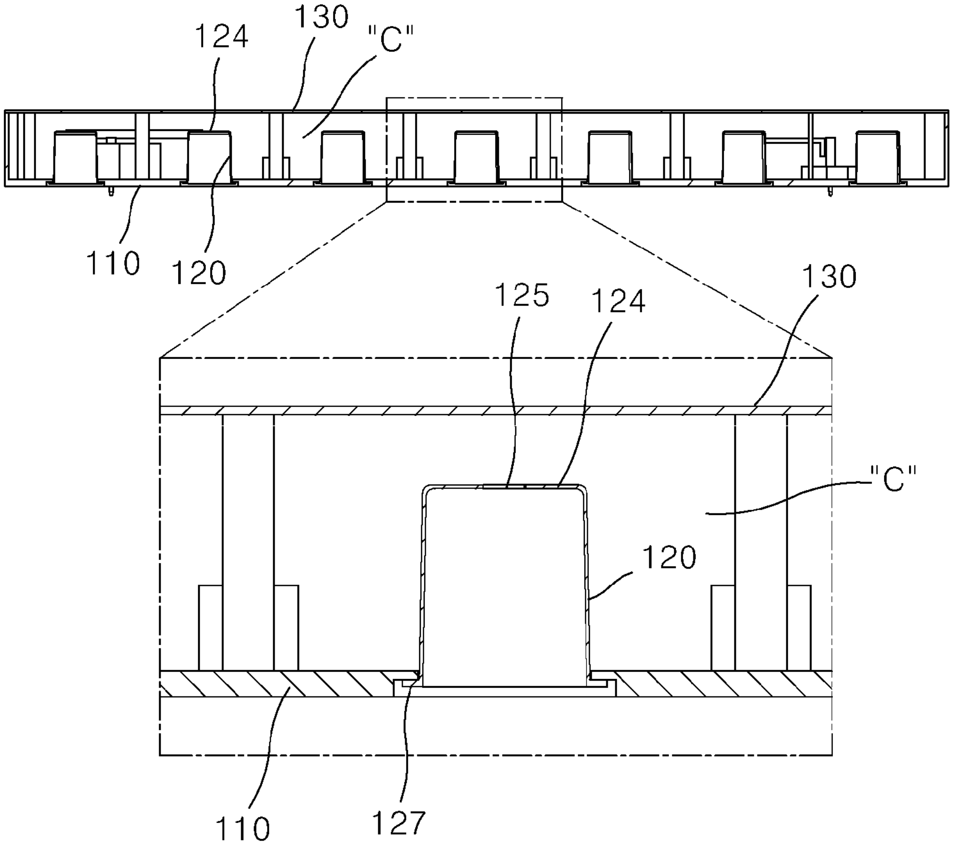
FIG. 7 is a vertical cross-sectional view of FIG. 2 and a partially enlarged view thereof.
Figure 8:
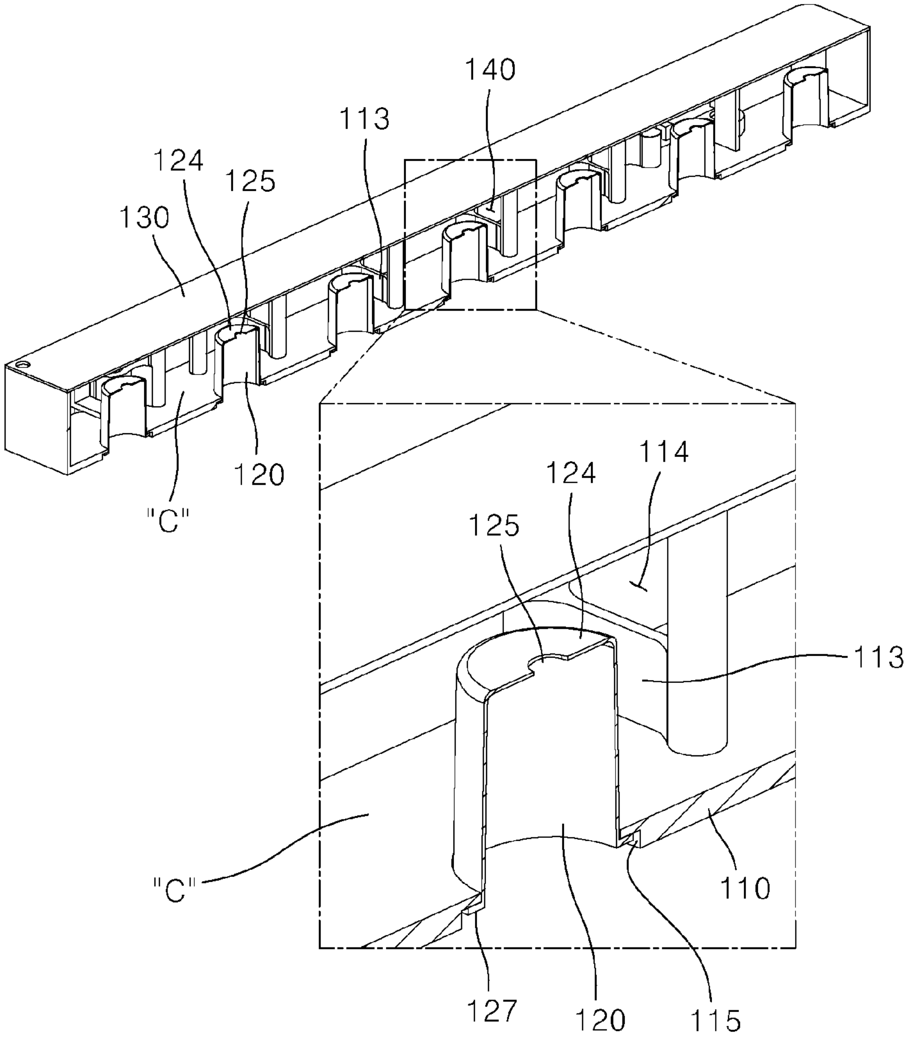
FIG. 8 is a vertical cross-sectional cutout view of FIG. 2 and a partially enlarged view thereof.

FIG. 7 is a vertical cross-sectional view of FIG. 2 and a partially enlarged view thereof, and FIG. 8 is a vertical cross-sectional cutout view of FIG. 2 and a partially enlarged view thereof.

As shown in FIGS. 7 and 8, the cavity filter assembly 100 according to the first embodiment of the present disclosure may have five resonance bars 120 installed to be inserted into the cavity C defined by the filter body 110 and the filter cover 130, and the frequency tuning within the cavity C may be performed by inserting the stamping tool through the empty internal space of the resonance bar 120 and adjusting the amount of stamping of the stamped part 124. In this case, since the plurality of resonance bars 120 may be installed so that each of the coupling flanges 127 is in contact with and coupled to each of the outer edge end portions of the plurality of resonance bar installation holes 115 formed in the filter body 110 and are provided in the cylindrical shape having the open one side, the stamped part 124 may be stamped using the stamping tool through the opened portion.

Since the cavity filter assembly 100 according to the first embodiment of the present disclosure has a different stamping direction from the cavity filter assembly 1 according to the related art shown in FIG. 1 and is provided to perform the frequency tuning within the cavity C through the shape deformation of the resonance bar 120 itself, it is possible to eliminate the resonance bar installation boss 15 (see FIG. 1) for installing the resonance bar 21 (see FIG. 1) compared to the related art and also eliminate the tuning screw 23, thereby achieving diversification in terms of the method of manufacturing the filter body 110 and reducing the overall manufacturing costs.

Describing the advantages in terms of the manufacturing method, for example, as shown in FIG. 1, when the resonance bar installation boss 15 (see FIG. 1) is integrally provided on the filter body 10, the method of manufacturing the filter body 10 may be only the molding method, and there is a limit to manufacturing by an extrusion method or a press method due to the shape of the resonance bar installation boss 15.

In addition, it is also possible to achieve the diversification of the method of manufacturing the filter cover 130 in that the cavity filter assembly 100 according to the first embodiment of the present disclosure may have the stamped part 124 provided on the resonance bar 120 and the frequency tuning may be performed through the shape deformation of the stamped part 124 of the resonance bar 120 completely irrelevant to the filter cover 130 unlike the fact that the stamped part 31 for the frequency tuning within the cavity C is integrally formed on the filter cover 30 in the configuration of the cavity filter assembly 1 according to the related art shown in FIG. 1. That is, it is possible to simplify the shape of the filter cover 130 in that the filter cover 130 serves to only shield the cavity C without forming the stamped part 31 for frequency tuning, thereby diversifying the manufacturing method thereof.

More specifically, as shown in FIG. 1, the manufacturing method is limited to manufacturing by the molding method when the stamped part 31 is formed on the filter cover 30, while it goes without saying that the filter cover 130 may be manufactured by an extrusion method (see a third embodiment of the present disclosure) or a deep-drawing press method also including a general press method (see a second embodiment of the present disclosure) when the stamped part 31 is eliminated from the filter cover 30.

Meanwhile, as shown in FIGS. 2 to 8, in the cavity filter assembly 100 according to the first embodiment of the present disclosure, the resonance bar 120 may be manufactured by the deep-drawing press method. As already well known, the deep-drawing press method is a method that is advantageous in manufacturing molded products in a cylindrical shape (or a rectangular parallelepiped shape) having an open one side using a punch tool after mounting a plate on a dice.

Figure 9A:
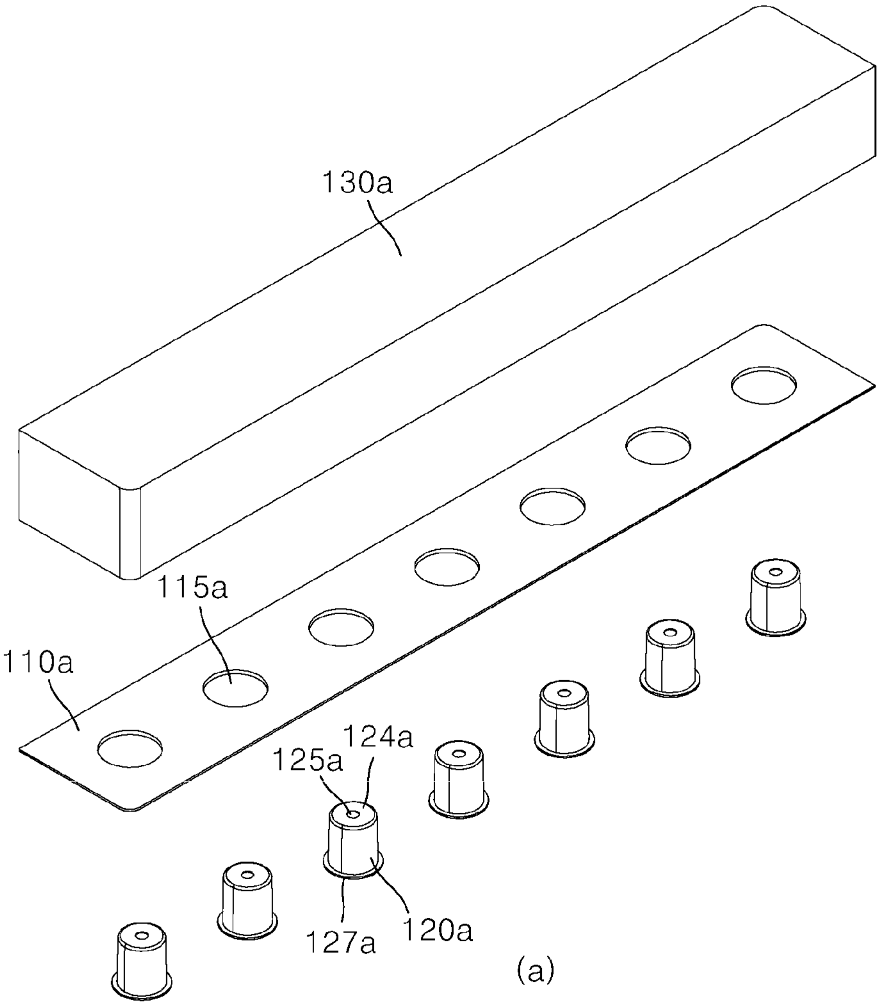
FIGS. 9A and 9B are each exploded perspective view and each cross-sectional view of cavity filter assemblies according to a second embodiment and a third embodiment of the present disclosure.
Figure 9A:
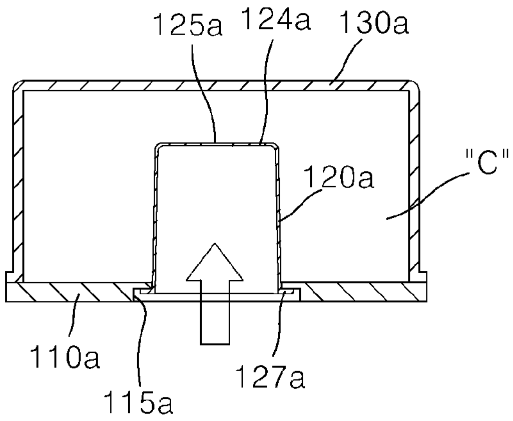
Figure 9B:
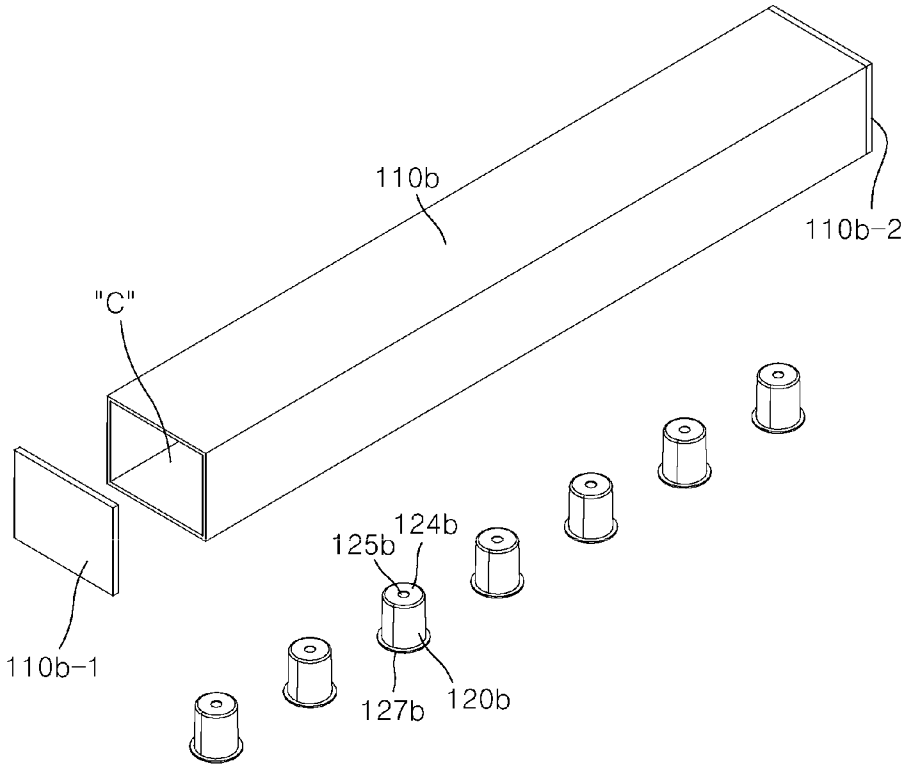
Figure 9B:
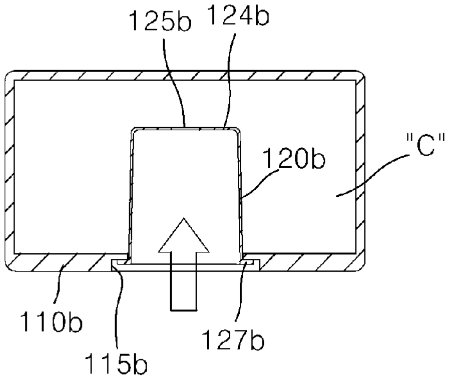

FIGS. 9A and 9B are each exploded perspective view and each cross-sectional view of cavity filter assemblies according to a second embodiment and a third embodiment of the present disclosure.

As shown in FIGS. 2 to 8, the cavity filter assembly 100 according to the first embodiment of the present disclosure is substantially defined by the filter body 110 including the cavity C for implementing the frequency characteristics approximately having a shape of the open one side and the filter cover 130 coupled to cover the open one side of the filter body 110, but the cavity C is necessarily defined according to the first embodiment.

That is, in the second embodiment of the present disclosure shown in FIG. 9A, the cavity C may be defined by a filter body 110*a* manufactured by the molding method to have a flat shape and a filter cover 130*a* manufactured by the deep-drawing press method so that a portion corresponding to the filter body 110*a* side has an open enclosure shape. Since the filter cover 130*a* itself may be manufactured by the deep-drawing press method, it is possible to greatly increase the productivity of the product.

Furthermore, in the third embodiment of the present disclosure shown in FIG. 9B, the cavity C may be defined by a filter body 110*b* manufactured by the extrusion method so that one end portion and the other end portion are open in a longitudinal direction and an one end cover 110*b*-1 and the other end cover 110*b*-2 for covering the opened one end and the other end of the filter body 110*b*. Comparing the cavity filter assembly 100 according to the first embodiment, it is possible to substantially eliminate the filter cover 130 itself for covering the open one side of the cavity C and easily manufacture the filter body 110*b* through the extrusion method, thereby greatly increasing the productivity of the product.

In addition, since the cavity filter assembly 100 according to the first embodiment to the third embodiment of the present disclosure configured as described above does not need to fix the resonance bar 21 using a separate tuning screw 23 or perform the primary frequency tuning and thus the tuning screw 23 is not required from the beginning, it is possible to eliminate some of the components. As described above, it goes without saying that it is also possible to reduce the manufacturing costs of the product by reducing the component costs due to the elimination of the component.

The cavity filter assembly according to the first embodiment to the third embodiment of the present disclosure may be defined as follows.

That is, the cavity filter assembly according to the embodiments of the present disclosure may be defined as a structure including the filter body 110 for defining the cavity C in which resonance is generated, at least forming the bottom surface of the cavity C, and having at least one resonance bar installation hole 115 passing through the inside and outside thereof formed therein, the filter cover 130 for defining the cavity C together with the filter body 110 and shielding the open portion of the filter body 110, and at least one resonance bar 120 installed to occupy a part of the internal space of the cavity C defined by the filter body 110 and the filter cover 130 through the resonance bar installation hole 115 of the filter body 110 and performing the frequency tuning through the deformation of the protruding surface (e.g., the stamped part 124) of the front end inside the cavity C.

Here, comparing the cavity filter assembly according to the related art (see FIG. 1 and the section of "Background Art"), in the related art, the frequency tuning within the cavity C is performed by changing the shape of the tuning stamped part formed on the filter cover and the tuning screw, but in the embodiments of the present disclosure, only the protruding surface (stamped part 124) of the front end of the resonance bar 120 is changed for the frequency tuning within the cavity C, and thus the present disclosure is different from the related art in terms of the frequency tuning method.

The cavity filter assembly according to the embodiments of the present disclosure has been described above in detail with reference to the accompanying drawings. However, it goes without saying that the embodiments of the present disclosure are not necessarily limited by the above-described embodiments, and various modifications and implementation within the equivalent scope are possible by those skilled in the art to which the present disclosure pertains. Accordingly, the true scope of the present disclosure will be determined by the appended claims.

INDUSTRIAL APPLICABILITY

The present disclosure provides the cavity filter assembly, which eliminates the fixing screw and the resonator installation boss, which are the main components of the conventional cavity filter, thereby reducing the overall weight and component cost of the antenna device, and simplifying the shape of the filter body to pursue the diversification of the method of manufacturing the filter cover and the resonator, including the filter body, thereby increasing the productivity of the product.

The invention claimed is:

1. A cavity filter assembly comprising:

a filter body having a cavity, which is a predetermined space, therein, wherein a resonance bar installation hole is formed in a bottom surface of the filter body; and at least one resonance bar formed in a cylindrical shape having an open end and a closed end opposite to the open end, the resonance bar being installed on the filter body through the resonance bar installation hole formed in the bottom surface of the filter body so that the closed end is positioned to extend into the cavity toward an upper side of the filter body opposite to the bottom surface, wherein the resonance bar is formed with a stamped part, which is a protruding surface protruding toward the cavity and protruding from the bottom surface of the filter body, to be parallel to the bottom surface of the filter body for frequency tuning within the cavity, as a front end surface of the closed end, and formed with an open tuning correction hole passing through a center of the stamped part.

2. The cavity filter assembly of claim 1, wherein the resonance bar performs the frequency tuning within the cavity through the stamping of the stamped part outside the filter body and corrects the tuned frequency through the tuning correction hole.

3. The cavity filter assembly of claim 1, wherein the frequency tuning within the cavity is performed by an operation in which the stamped part of the resonance bar is stamped into the cavity by a stamping tool inserted into the resonance bar and a shape of the stamped part is deformed.

4. The cavity filter assembly of claim 3, wherein a correction of the frequency tuning within the cavity is performed by an operation in which the stamped part of the resonance bar is pulled to an outside of the cavity by a pulling tool inserted into the resonance bar from an outside of the filter body and then inserted into the cavity through the tuning correction hole and a shape of the stamped part is deformed.

5. The cavity filter assembly of claim 1, further comprising a filter cover coupled along an end of an edge portion of the filter body to form the cavity together with the filter body.

6. The cavity filter assembly of claim 1, wherein a coupling flange is formed on an outer surface of the open end of the resonance bar and is coupled in close contact with an outer surface of an edge of the resonance bard installation hole.

7. The cavity filter assembly of claim 1, wherein the tuning correction hole is formed in a hole shape having a predetermined diameter at the center of the stamped part.

8. The cavity filter assembly of claim 1, wherein a plurality of cavities are provided by a partition wall for partitioning some of adjacent resonance bars among the at least one resonance bar and a window having a shape in which a part of the partition wall is cut.

9. The cavity filter assembly of claim 1, wherein the cavity is defined by the filter body manufactured by a molding method to have an enclosure shape having an open one side and a filter cover manufactured by a press method to cover an open one side of the filter body.

10. The cavity filter assembly of claim 9, wherein the resonance bar is manufactured by the deep-drawing press method.

11. The cavity filter assembly of claim 1, wherein the cavity is defined by the filter body manufactured by a molding method to have a flat shape and a filter cover coupled along an edge end portion of the filter body and manufactured by a deep-drawing press method so that a portion corresponding to the filter body side has an open enclosure shape.

12. The cavity filter assembly of claim 1, wherein the cavity is defined by the filter body manufactured by an extrusion method so that one end portion and the other end portion are open in a longitudinal direction and an one side end cover and the other side end cover for covering the open one end portion and the other end portion of the filter body in the longitudinal direction.

13. A cavity filter assembly comprising:

a filter body for defining a cavity in which resonance is generated, at least forming a bottom surface of the cavity, and formed with at least one resonance bar installation hole formed in the bottom surface and passing through the bottom surface to communicate between an inside and an outside of the filter body;

a filter cover for defining the cavity together with the filter body and shielding an open portion of the filter body; and at least one resonance bar formed in a cylindrical shape having an open end and a closed end opposite to the open end, the resonance bar being installed to occupy a part of an internal space of the cavity defined by the filter body and the filter cover through the resonance bar installation hole of the filter body so that the closed end is positioned inside the cavity and performing frequency tuning through the deformation of a protruding surface formed as a stamped part of a front end of the closed end inside the cavity, wherein the resonance bar is formed with an open tuning correction hole passing through the stamped part.

* * * * *